United States Patent
Carlson et al.

(10) Patent No.: US 7,446,806 B2
(45) Date of Patent: Nov. 4, 2008

(54) SINGLE CHIP, NOISE-RESISTANT, ONE-DIMENSIONAL, CMOS SENSOR FOR TARGET IMAGING

(75) Inventors: Bradley Carlson, Huntington, NY (US); Mei Yan, Port Jefferson Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1110 days.

(21) Appl. No.: 10/741,144

(22) Filed: Dec. 19, 2003

(65) Prior Publication Data

US 2005/0134714 A1  Jun. 23, 2005

(51) Int. Cl.
H04N 3/14 (2006.01)
H04N 5/335 (2006.01)

(52) U.S. Cl. .............. 348/308; 348/310; 348/241; 250/208.1; 235/462.29

(58) Field of Classification Search ............ None
See application file for complete search history.

(56) References Cited

U.S. PATENT DOCUMENTS

| 5,461,425 | A  | * | 10/1995 | Fowler et al. ............ 348/294 |
| 6,380,880 | B1 | * | 4/2002  | Bidermann ............ 341/155 |
| 6,583,817 | B1 | * | 6/2003  | Lee ............ 348/241 |
| 6,956,607 | B2 | * | 10/2005 | Mizuno et al. ............ 348/308 |
| 6,977,363 | B2 | * | 12/2005 | Kokubun ............ 250/208.1 |
| 6,980,239 | B1 | * | 12/2005 | Motta ............ 348/211.6 |
| 7,040,538 | B2 | * | 5/2006  | Patel et al. ............ 235/454 |
| 7,139,025 | B1 | * | 11/2006 | Berezin ............ 348/308 |
| 2002/0158982 | A1 | * | 10/2002 | Kokubun et al. ............ 348/308 |

FOREIGN PATENT DOCUMENTS

JP  2002354195 A  * 12/2002

* cited by examiner

Primary Examiner—Ngoc-Yen Vu
Assistant Examiner—Cynthia Calderon
(74) Attorney, Agent, or Firm—Kirschstein, et al.

(57) ABSTRACT

A linear sensor array for imaging coded indicia includes an analog front end and a digital back end integrated on a single CMOS chip. A real-time, correlated double sampling circuit is used for noise suppression.

7 Claims, 3 Drawing Sheets

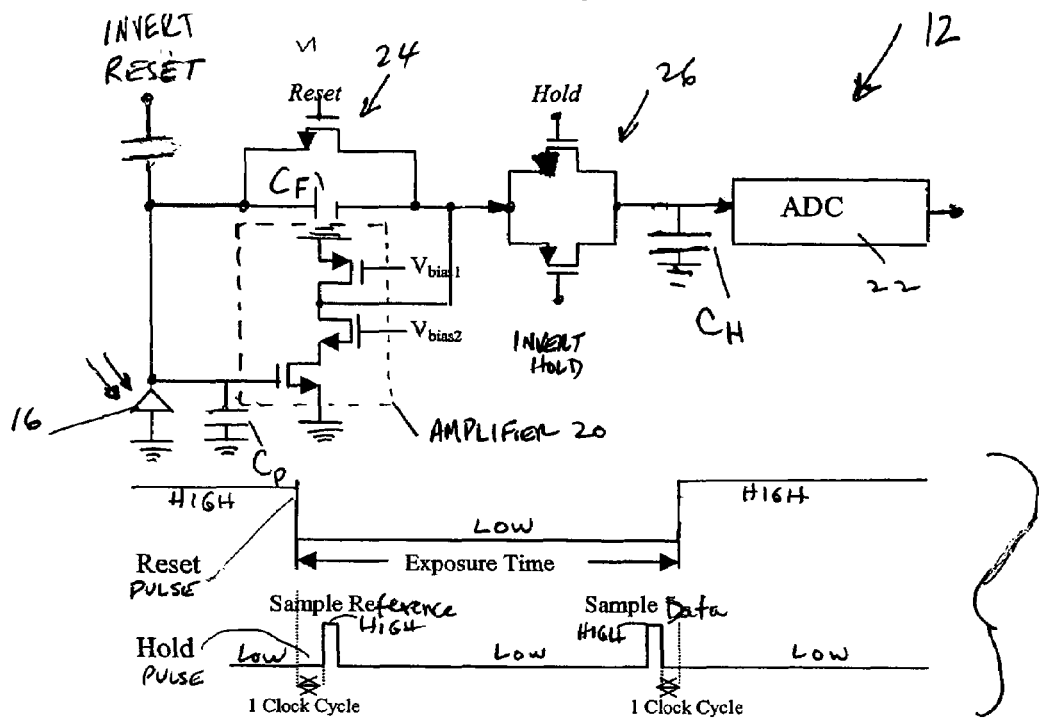
FIG. 2
FIG. 3
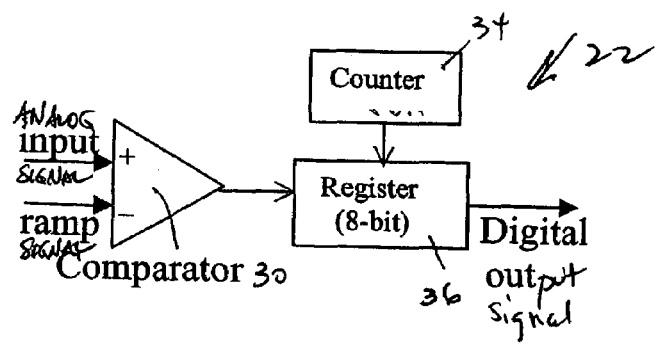
FIG. 4

SINGLE CHIP, NOISE-RESISTANT, ONE-DIMENSIONAL, CMOS SENSOR FOR TARGET IMAGING

BACKGROUND OF THE INVENTION

1. Field of the Invention

The present invention generally relates to electro-optical readers for reading indicia such as bar code symbols and, more particularly, to a noise-resistant, imaging sensor fabricated on a single semiconductor chip as a linear array and operative for imaging one-dimensional symbols.

2. Description of the Related Art

Both charge-coupled device (CCD) and complementary metal-oxide semiconductor (CMOS) image sensors are used in digital cameras for imaging a target. Each such two-dimensional, solid-state sensor has a multitude or array of cells or pixels for converting incident light into electrons. In a CCD sensor, an accumulated charge of each cell is transported across, and read out of, the array. In a CMOS sensor, one transistor or several transistors at each pixel amplify and move the charge using traditional wires. CCD sensors have excellent light sensitivity and produce high quality images, whereas CMOS sensors have lower sensitivity, but are much less expensive to manufacture and have an extended battery life.

Targets, such as optical codes, typically one- or two-dimensional bar code symbols, can also be electro-optically read by readers using a solid-state CCD sensor. A conventional linear or one-dimensional sensor array using CCD technology requires a non-standard fabrication process and the use of multiple, semiconductor chips, for example, one chip for an analog front end, another chip for a digital back end, still another chip for a timing and control circuit, still an additional chip for noise suppression, etc. The use of several support chips results in more total power consumption and a large, overall size for the CCD sensor. These aspects tend to detract from using a CCD sensor in a bar code symbol reader, especially a handheld, portable reader where size and power consumption are desired to be minimized.

SUMMARY OF THE INVENTION

OBJECTS OF THE INVENTION

Accordingly, it is a general object of this invention to reduce power consumption, and to reduce cost and size, of an image sensor for use in an electro-optical reader for reading one-dimensional bar code symbols.

More particularly, it is an object of the present invention to use a CMOS sensor that is fabricated by standard CMOS fabrication techniques.

Still another object of the present invention is to fabricate the CMOS sensor and all support image capture and processing circuitry on a single semiconductor chip.

It is yet another object of the present invention to render handheld readers less susceptible to short battery lifetimes and bulkiness.

A still further object of the present invention is to suppress electrical noise generated when all the support circuitries are integrated on a single CMOS-based chip.

FEATURES OF THE INVENTION

In keeping with the above objects and others which will become apparent hereinafter, one feature of the present invention resides, briefly stated, in a system for imaging a target such as a one-dimensional symbol, the system comprising a single, solid-state, complementary metal-oxide semiconductor (CMOS) chip, an analog front end integrated on the single chip, and a digital back end integrated on the same chip. The front end includes a linear array of cells or pixels, each pixel having a photodiode for converting incident light into an electrical analog signal, and an analog-to-digital converter (ADC) for each photodiode and operative for converting the analog signal to an electrical digital signal. The digital back end includes a digital processor for processing the digital signal into a digitized output signal having information related to the imaged symbol. The digital back end can produce a raw image of the target, or can determine the information encoded in the target.

The use of CMOS technology allows integration of the analog front end, the digital back end, as well as other circuits, as described below, and achieves the advantages of reduced overall system size and cost, faster read-out speed of the information, and lower power consumption. However, these advantages come at the expense of high system noise and is a primary factor as to why CMOS technology has not heretofore been used for imaging symbols, especially bar code symbols. The overall system noise can come from a myriad of sources, such as white noise, dark current and fixed-pattern noise, all of which are inherent in the choice of sensor, as well as device electronic noise generated within electrical components and includes thermal noise generated by random thermally induced electron motion and flicker noise caused by crystal manufacturing defects and contaminants in the electrical components, interference noise generated from the environment and includes supply voltage noise, cross-talk noise and substrate noise, especially that caused by coupling between the analog front end and the digital back end, reset noise (also called KTC noise which is caused by the thermodynamic uncertainty of the number of charges on a capacitor) generated during resetting of the sensors and shot noise associated with the random arrival of photons at any sensor. The fixed-pattern noise is caused by system variations and non-uniformities in the pixels.

In accordance with this invention, each pixel has noise suppression circuitry including means for pulsing a respective photodiode to convert the incident light to the analog signal during an exposure time period, and a sample-and-hold circuit for sampling the analog signal after the exposure time period has begun to generate a reference signal, and for again sampling the analog signal before the exposure time period has ended to generate a data signal.

A clock is integrated on the single chip and generates clock cycles during system operation. The sample-and-hold circuit preferably generates the reference signal one clock cycle, or virtually immediately, after the exposure time period has begun. Thus, the reference signal is essentially all noise since the photodiode has not yet had enough time to capture the symbol. The sample-and-hold circuit preferably generates the data signal one clock cycle, or virtually immediately, before the exposure time period has ended. Thus, the data signal has had enough time to capture the symbol, as well as the noise. As explained below, the data and reference signals are subtracted in a subtractor also integrated on the single chip in order to obtain the noise-suppressed, digitized output signal.

Other means for suppressing noise include the selection and design of a photodiode to have high quantum efficiency and low dark current, the placement of a high gain amplifier in each pixel immediately after the photodiode, and the use of an ADC for each photodiode so as to convert the analog signal to the digital signal as early as possible in the signal processing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is an electrical circuit depicting an analog front end of the circuitry of FIG. 1;

FIG. 3 are waveforms for describing the operation of noise suppression components in the circuit of FIG. 2;

FIG. 4 is a block diagram depicting an analog to digital converter for use in the circuitry of FIG. 1.

DETAILED DESCRIPTION OF THE PREFERRED EMBODIMENTS

Figure 1:
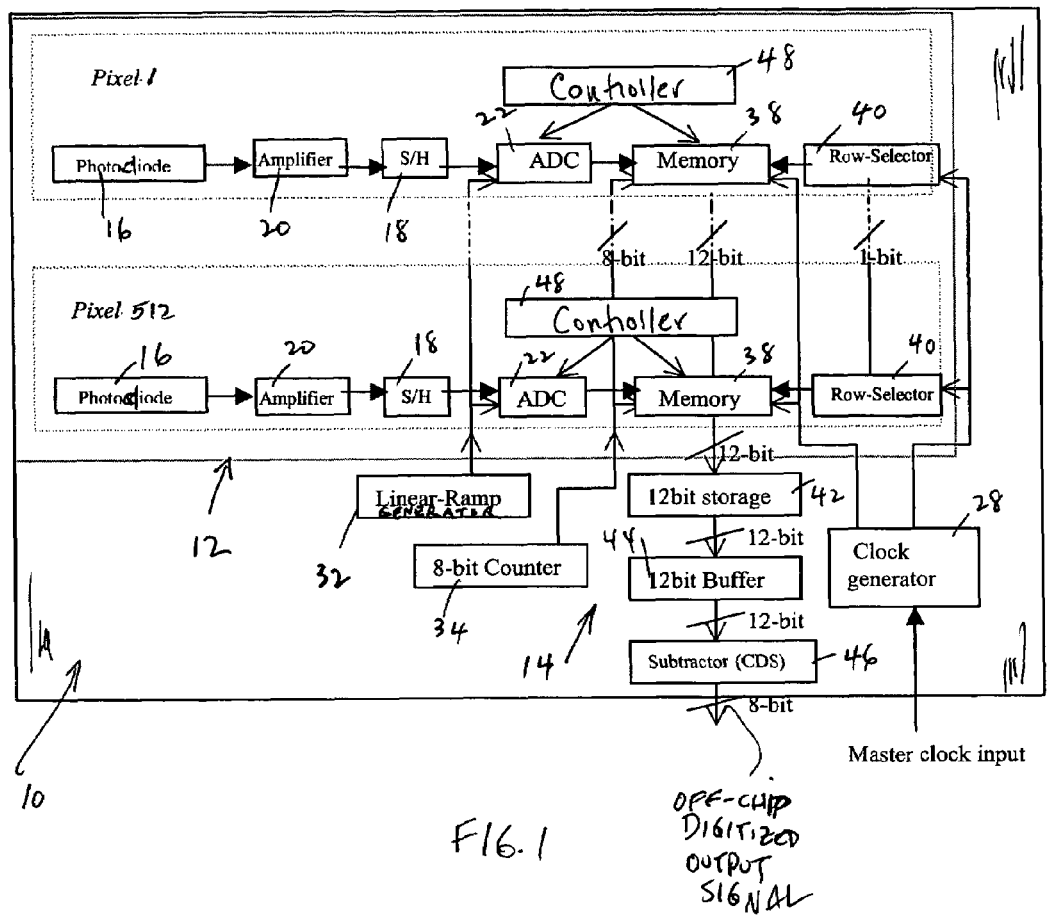
FIG. 1 is a block diagram of a chip having electrical circuitry in accordance with this invention.

Referring to FIG. 1, reference numeral 10 generally identifies a single, solid-state, complementary metal-oxide semiconductor (CMOS) chip having an analog front end 12 and a digital back end 14, both the front and back ends being integrated on the same, single CMOS chip 10. The chip is used for imaging a target, especially a one-dimensional coded symbol such as a Universal Product Code (UPC) symbol.

The front end 12 includes a linear array of pixels, preferably 512 to 4096 pixels in all. Each pixel includes a photodiode 16, a sample-and-hold (S/H) circuit 18, a high gain amplifier 20, and an analog-to-digital converter (ADC) 22 which are shown in detail in FIG. 2. All the other components in FIG. 1 are part of the digital back end.

The photodiode 16 converts incident light into an electrical analog signal. The photodiode has a lower white noise, dark current and fixed-pattern noise as compared to a phototransistor. The photodiode generally has a width between 4 μm and 8 μm, and a height 1 to 16 times the width. The photodiode generates a photocurrent and collects a charge over an integration time, the charge being converted to a voltage by a capacitor $C_P$ which represents the self-capacitance of the photodiode plus any connected components. The photodiode is reset and pulsed so as to receive incident light over an exposure time period (see FIG. 3).

The photocurrent is amplified by a feedback charge amplifier 20 having three stacked transistors and a feedback capacitor $C_F$ arranged in an operational amplifier configuration. A reset switch 24 is connected in parallel with the feedback capacitor. A MOSFET hold switch 26 is connected in series with the feedback capacitor. A hold capacitor $C_H$ is connected in series between the hold switch 26 and the ADC 22. The hold switch 26 and the hold capacitor constitute a sample-and-hold circuit for noise suppression prior to conducting the analog signal to the ADC for digital conversion.

As can be seen with the aid of FIG. 3, the sample-and-hold circuit operates as follows: A reset pulse having high and low states is applied to reset switch 24. An inverted reset pulse is applied to the photodiode through a capacitor. A hold pulse having high and low states is applied to one side of the hold switch 26. An inverted hold pulse is applied to the opposite side of the hold switch 26. When the reset pulse goes low, and the photodiode is activated to receive light at the beginning of the exposure time period, then a charge begins to build on $C_P$, and this charge is transferred to the feedback capacitor $C_F$ because the reset switch is open. At the same time, the hold pulse is low, and the hold switch is open, and no charge is transferred to the holding capacitor $C_H$.

Virtually immediately after the exposure time has begun, for example, one clock cycle later, the hold pulse goes high, and the hold switch is closed, thereby allowing the charge on the feedback capacitor to transfer to the holding capacitor. The charge accumulates on the holding capacitor for a few more cycles until the hold pulse goes low, thereby isolating the holding capacitor. The ADC, as explained below, converts the accumulated charge on the holding capacitor to a four-bit reference signal, which represents the reset noise in the system. The photodiode has not yet had sufficient time to capture light from the target symbol.

Thereupon, towards the end of the exposure time period, for example, one clock cycle before the expiration, the hold pulse goes high, and the hold switch is closed, thereby again allowing all the charge stored on the capacitor $C_P$ to be transferred to the feedback capacitor and, in turn, to the holding capacitor $C_H$. At this time, the photodiode has had sufficient time to capture light from the target symbol. The ADC converts this accumulated charge to an eight-bit data signal, which represents the information in the symbol as well as the reset noise. As explained below, the reference signal is subtracted from the data signal to obtain a noise-suppressed digitized output signal.

Finally, at the end of the exposure time, the reset pulse goes high, and the reset switch is closed. This shorts out the feedback capacitor and, in effect, resets or prepares it to receive charge when the reset pulse again goes low.

The clock cycles are generated from an off-chip masterclock by a clock 28 also integrated on the chip. In the preferred embodiment, the clock operates at 500 kHz; the exposure time period varies from 30 μs to 10 ms; and the hold pulses stay high for a sampling time period on the order of 2 μs.

As seen in FIG. 3, two samplings are conducted during the exposure time period. This real-time correlated double sampling (CDS) technique suppresses the reset or KTC noise. This is different from known CDS techniques where an analog signal from a CCD array is applied to two separate hold switches and to two separate holding capacitors.

The ADC 22, as shown in FIG. 4, is a single slope device, and includes a capacitor 30 having a positive terminal connected to the holding capacitor to receive the reference signal or the data signal, and a negative terminal connected to a linear ramp generator 32 (see FIG. 1) integrated on the chip. An eight-bit counter 34 is connected to a data input terminal of the register 36 which is connected to an output of the comparator. The comparator output controls the enable terminal of the register.

In operation, the linear ramp generator 32 and the counter 34 are started at the same time. The ramp generator 32 generates a linear, single slope, ramp signal. When the comparator 30 detects that the ramp signal reaches the input signal, the register 36 latches the count value of the counter, which is the digital representation of the analog input signal. Only four bits (16 counts) are used for the reference signal, and eight bits (256 counts) are used for the data signal. Preferably, the ramp generator is a Gm-C integrator, and the counter 34 is a T flip-flop, synchronous counter.

Figure 5:
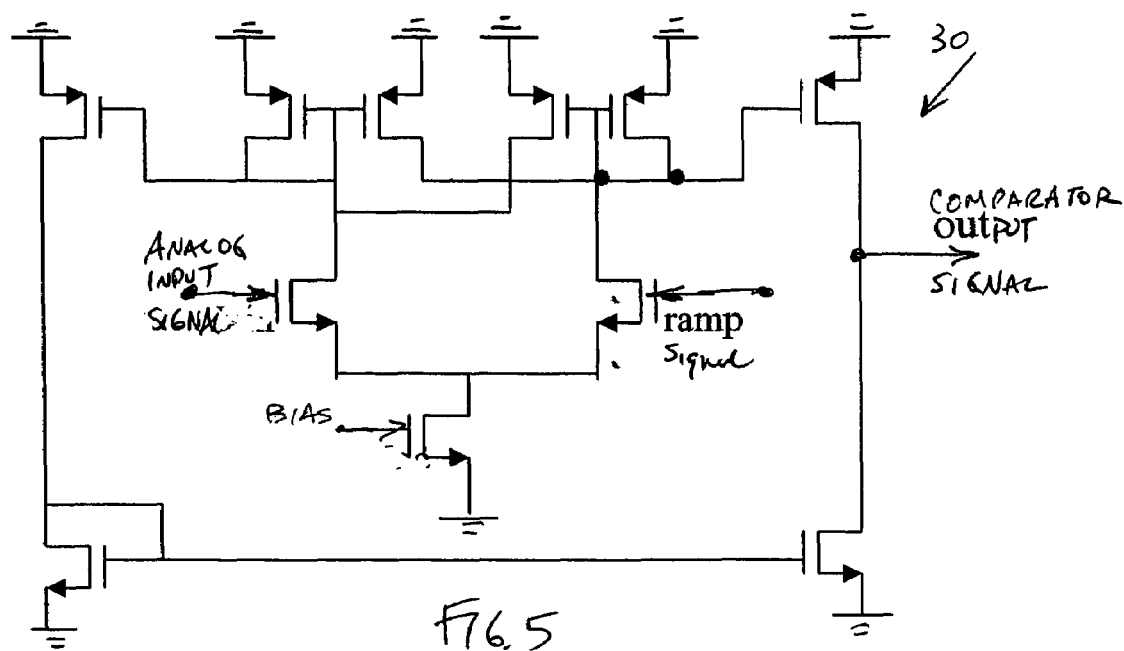
FIG. 5 is an electrical circuit depicting the comparator of FIG. 4.

FIG. 5 is a circuit implementation of the comparator 30 and includes a two-stage comparator having a differential input stage and a single-ended gain stage with cross-coupled bistable structure to eliminate chattering.

The digital back end 14 includes, for each pixel, a memory 38, a row selector 40, and a controller 48. A twelve-bit storage register 42, a twelve-bit buffer 44, and a subtractor 46 are also integrated on the chip and are shared by all the pixels.

The memory 38 is preferably a twelve-bit register operating at 12 MHz for storing the eight-bit data signal and the four-bit reference signal. The row selector 40 includes a one-bit shift register and a multiplexer both operating at 1 MHz. The shift register selects one register at a time from the 512 registers from all the pixels, and then shifts the data off the selected pixel. Alternatively, the pixel memories can be connected to a common bus and multiplexed onto the bus. The data shifted from the first selected pixel is stored in the twelve-bit storage register 42, and then forwarded to the buffer 44, and finally forwarded to the subtractor 46 to implement the CDS subtraction. In the meantime the next pixel is selected for data read-out, storage and processing. The controller 48 is operatively connected to the circuitry on the chip to control the timing among the various devices.

It will be understood that each of the elements described above, or two or more together, also may find a useful application in other types of constructions differing from the types described above.

While the invention has been illustrated and described as embodied in a single chip, noise-resistant, one-dimensional, CMOS sensor for target imaging, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A system for imaging a one-dimensional coded symbol, comprising:
    a single, solid-state, complementary metal-oxide semiconductor (CMOS) chip;
    an analog front end integrated on the single chip and including a linear array of pixels, each pixel having a photodiode for converting incident light into an electrical analog signal, and an analog-to-digital converter (ADC) for each photodiode and operative for converting the analog signal to an electrical digital signal, the front end including noise suppression circuitry for each pixel, the noise suppression circuitry including means for pulsing a respective photodiode to convert the incident light to the analog signal during an exposure time period, and means for sampling the analog signal after the exposure time period has begun to generate a reference signal, and for again sampling the analog signal before the exposure time period has ended to generate a data signal; and
    a digital back end integrated on the single chip and including a digital processor for processing the digital signal into a digitized output signal having information related to the imaged symbol.

2. The system of claim 1, and a clock for generating clock cycles during system operation, and wherein the sampling means generates the reference signal one clock cycle after the exposure time period has begun, and generates the data signal one clock cycle before the exposure time period has ended.

3. The system of claim 1, wherein the sampling means includes a reset switch in parallel with a feedback capacitor, and wherein the feedback capacitor is connected to the photodiode, and wherein the reset switch is switchable between an open state in which the analog signal from the photodiode charges the feedback capacitor, and a closed state in which the reset switch shorts the feedback capacitor.

4. The system of claim 3, wherein the sampling means includes a hold switch in series with the feedback capacitor and a hold capacitor, and wherein the hold switch is switchable between a closed state in which the charged feedback capacitor charges the hold capacitor, and an open state in which the charged feedback capacitor is blocked from the hold capacitor.

5. The system of claim 4, wherein the ADC is operative for converting the reference signal and the data signal into respective multiple bit signals, and a subtractor integrated on the single chip for subtracting the reference signal from the data signal to obtain the digitized output signal.

6. The system of claim 1, wherein the analog front end includes a high gain amplifier for amplifying the analog signal before reaching the ADC.

7. The system of claim 1, wherein the ADC includes a comparator having one input for receiving the reference signal and the data signal, another input for receiving a ramp signal, and an output connected to a register to which a counter is connected.

* * * * *